US012595900B2

(12) United States Patent
Mueller

(10) Patent No.: US 12,595,900 B2
(45) Date of Patent: Apr. 7, 2026

(54) MAGNETIC LIGHT HANGING KIT

(71) Applicant: Grayson Mueller, Rathdrum, ID (US)

(72) Inventor: Grayson Mueller, Rathdrum, ID (US)

( * ) Notice: Subject to any disclaimer, the term of this patent is extended or adjusted under 35 U.S.C. 154(b) by 130 days.

(21) Appl. No.: 18/732,457

(22) Filed: Jun. 3, 2024

(65) Prior Publication Data

US 2025/0369599 A1 Dec. 4, 2025

(51) Int. Cl.

*F21V 21/096* (2006.01)
*B25G 1/04* (2006.01)
*F21S 4/10* (2016.01)
*F21W 121/00* (2006.01)
*F21Y 113/00* (2016.01)
*H01F 7/02* (2006.01)

(52) U.S. Cl.

CPC .............. *F21V 21/096* (2013.01); *B25G 1/04* (2013.01); *F21S 4/10* (2016.01); *F21W 2121/004* (2013.01); *F21Y 2113/00* (2013.01); *H01F 7/02* (2013.01)

(58) Field of Classification Search

CPC ...... F21V 21/096; F21V 21/0965; B25G 1/04
See application file for complete search history.

(56) References Cited

U.S. PATENT DOCUMENTS 5,560,975 A * 10/1996 Casper .................... F21V 21/36 24/373
6,352,291 B1 * 3/2002 Tortajada .................. F21S 4/10 294/24
7,367,697 B2 * 5/2008 George ..................... F21S 4/10 362/396
7,806,568 B2 10/2010 Nielson
7,914,185 B2 3/2011 Moore
8,491,168 B2 7/2013 Cooper
8,506,136 B1 * 8/2013 Herdt ...................... F21V 21/34 362/249.14
D772,027 S 11/2016 Chi Man
9,784,439 B2 10/2017 Baker
10,344,956 B2 7/2019 Hess
10,957,284 B1 3/2021 Nay
2009/0010012 A1 * 1/2009 George ................. F21V 21/096 362/427
2011/0038159 A1 2/2011 Carlson
2013/0042958 A1 * 2/2013 Spindler ................... F21S 4/10 248/205.3

(Continued)

FOREIGN PATENT DOCUMENTS

CA 2577619 A1 8/2008

*Primary Examiner* — Jason L Vaughan
*Assistant Examiner* — Amanda Kreiling
(74) *Attorney, Agent, or Firm* — Lee & Hayes, P.C.

(57) ABSTRACT

A kit for removably attaching a string of lights to a roofline, the kit comprising: first magnets of a first magnetic force; screws configured to pass through apertures of corresponding first magnets to fasten the corresponding first magnets to respective points on the roofline; metal tabs configured to magnetically couple to the first magnets; rings configured to secure respective metal tabs to the string of lights; and a pole configured to hoist the string of lights to the roofline, wherein the pole includes a second magnet on a distal position on the pole that magnetically couples to the metal tab when raising the string of lights to the roofline, wherein the second magnet has a lower magnetic force than the first magnet.

20 Claims, 4 Drawing Sheets

(56) References Cited

U.S. PATENT DOCUMENTS

| | | | |
|---|---|---|---|
| 2019/0264866 | A1 | 8/2019 | Raab et al. |
| 2020/0199877 | A1 | 6/2020 | Forgue |
| 2021/0180626 | A1 | 6/2021 | Chi Man |

* cited by examiner

MAGNETIC LIGHT HANGING KIT

BACKGROUND

Injuries from falls from ladders and roofs during installation of lights (e.g., Christmas lights, etc.) on rooflines of houses are all too common, and often occur because of falls from ladders or roofs. Uneven ground, inclement weather, and balancing while simultaneously hanging the lights all carry a risk of falling. Falls may result in serious injury or death.

Additionally, conventionally, plastic clips that attach to gutters or shingles are commonly used to hang the lights. These plastic clips are susceptible to breakage during installation and become brittle over time, thus requiring replacement.

What is needed is a kit to install a string of lights on a house or other structure that minimizes use of ladders, walking on roofs, and replacing of plastic clips.

TECHNICAL FIELD

The technical field of the systems and method described herein is light installation.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
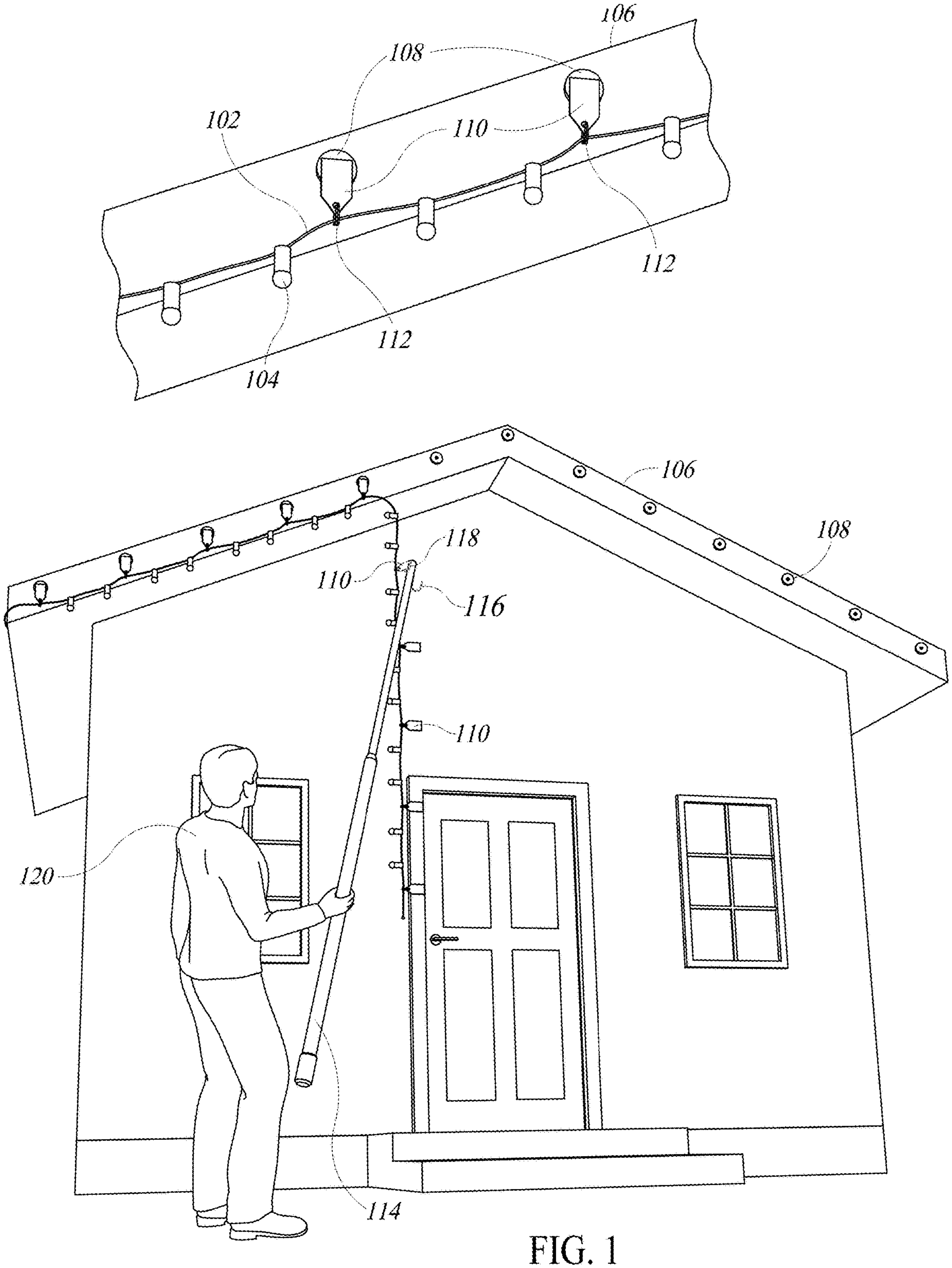
FIG. 1 is an illustrative environment for an example of a magnetic light hanging kit as described herein.

A kit for installing a string of lights on a roofline of a building structure is described. In examples described herein, an installation pole (which may be telescoping) may include a ceramic ferrite magnet affixed to its distal end, wherein a user may hold the installation pole from the proximal end. A plurality of metal tabs may be fastened via respective rings along a string of lights, wherein individual metal tabs include a slot via which a respective ring may be inserted. The installation pole may be brought near a metal tab, and the ceramic ferrite magnet on the pole may attract the metal tab so that the ceramic ferrite magnet and metal tab magnetically couple. The installation pole may be lifted to the roofline, with the string of lights connected to the ceramic ferrite magnet via a metal tab and the rings, where the metal tab may decouple from the ceramic ferrite magnet as the metal tab is magnetically drawn to a neodymium magnet affixed to the roofline. The neodymium magnet has a stronger attractive magnetic force than the ceramic ferrite magnet may pull the metal tab off of the ceramic ferrite magnet. That is, the relative magnetic forces of the neodymium magnet and the ceramic ferrite magnet differ. In this way, the string of lights may be strung from the roofline from neodymium magnet to neodymium magnet. In examples, to disconnect the string of lights from the roofline, a hook on the distal end of the installation pole may be wrapped around the string of lights or the metal tab(s) and pulled, so that the magnetic bond between the neodymium magnets and metal tabs breaks and the string of lights disengages from the roofline.

For the purpose of this disclosure, a "roofline magnet" may refer to a magnet attachable to a roofline, as roofline is defined herein. For the purpose of this disclosure, "neodymium magnet" or "neodymium roofline magnet" is a roofline magnet containing neodymium (e.g., $Nd_2Fe_{14}B$, etc.).

For the purpose of this disclosure, a "roofline" may refer to a roofline of a house and/or other exterior surface of a building structure onto which a roofline magnet may be mounted. In examples, a roofline may include at least one of a gutter, an cave, a window frame, or a shingle, etc.

For the purpose of this disclosure, a "pole magnet" comprises a magnet attached to a distal end of an installation pole. In examples, the pole magnet may be made of ceramic ferrite.

For the purpose of this disclosure, a "string of lights" may include a wire (or wires) along which periodic lightbulbs (e.g., LED, incandescent, etc.) are placed. An electrical plug may be included on at least one end. The wire(s) may be of different gauges (e.g., 18, 20, 22 gauge, etc.) The string of lights may include braided wires housed in plastic. In examples, the string of lights may comprise other decorative objects (e.g., ornaments that are not lights, etc.)

The kit described herein represents an improvement to traditional kits for light installation at least by providing a long-lasting, safe, and corrosion- and decay-resistant means for hanging strings of lights.

Reference to an "example" in this document does not limit the described elements or features to a single embodiment; all described elements and features may be combined in any embodiment in any number of ways unless otherwise described. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

In the following detailed description, references are made to the accompanying drawings that form a part hereof, and that show, by way of illustration, specific embodiments or examples. The drawings herein are not necessarily drawn to scale. Like numerals may represent like elements throughout the several figures (which may be referred to herein as a "FIG." or "FIGS.").

FIG. 1 is an illustrative environment 100 for an example of a magnetic light hanging kit as described herein. FIG. 1 is meant to provide a general representation of the illustrative environment 100. However, the size, shape, and placement of the items in FIG. 1 are not meant to be limiting.

The illustrative environment 100 shows a string of lights 102 with a lightbulb 104 of a plurality of lightbulbs, a roofline 106 of a building structure, a roofline magnet 108 of a plurality of roofline magnets, a metal tab 110 of a plurality of metal tabs, a ring 112 of a plurality of rings, an installation pole 114 with a hook 116 on a first side of the installation pole 114, and a pole magnet 118 on a second side of the installation pole 114, as well as a person 120 installing the string of lights 102. In examples, the hook 116 and pole magnet 118 may be connected to a distal end or distal end cap of the installation pole.

In examples, a kit comprises (1) a plurality of roofline magnets 108, (2) a plurality of screws (not shown) to affix respective roofline magnets of the plurality of roofline magnets to the roofline 106, (3) a plurality of metal tabs 110 to magnetically attach to respective roofline magnets 108 of the plurality of roofline magnets, (4) rings 112 that loop into both the string of lights 102 and the metal tabs 110, latching individual rings to the string of lights 102, and (5) a installation pole 114 including pole magnet 118 and hook 116. In examples, the kit may have fewer or more than these components. For example, the installation pole 114 may not include the hook 116. In examples, the roofline magnet 108 may be mounted to the roofline without screws.

Figure 2A:
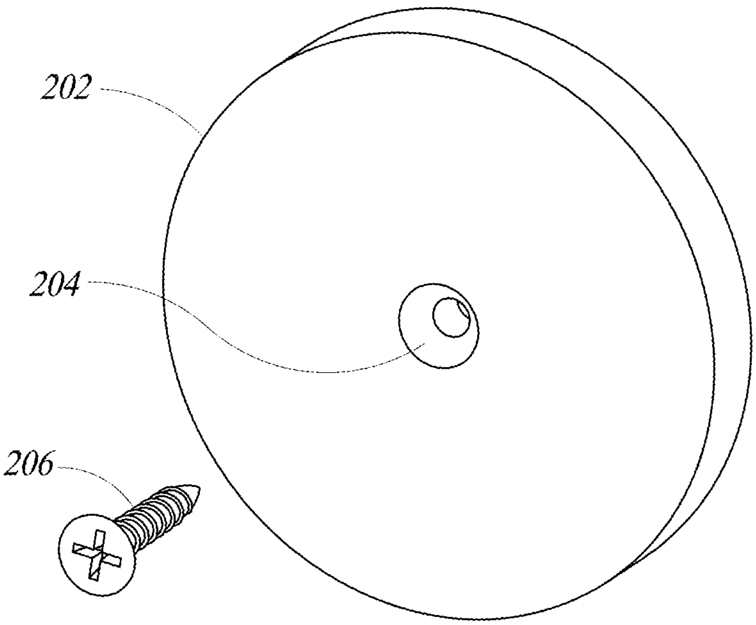
FIG. 2A is an illustration of a perspective top view of a roofline magnet and a screw, as described here.
Figure 2B:
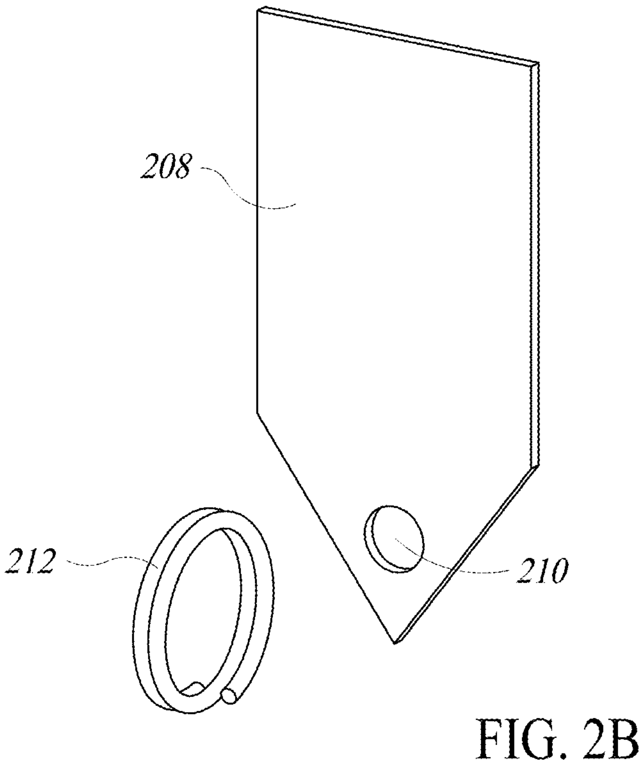
FIG. 2B is an illustration of a perspective top view of a metal tab and ring, as described herein.
Figure 2C:
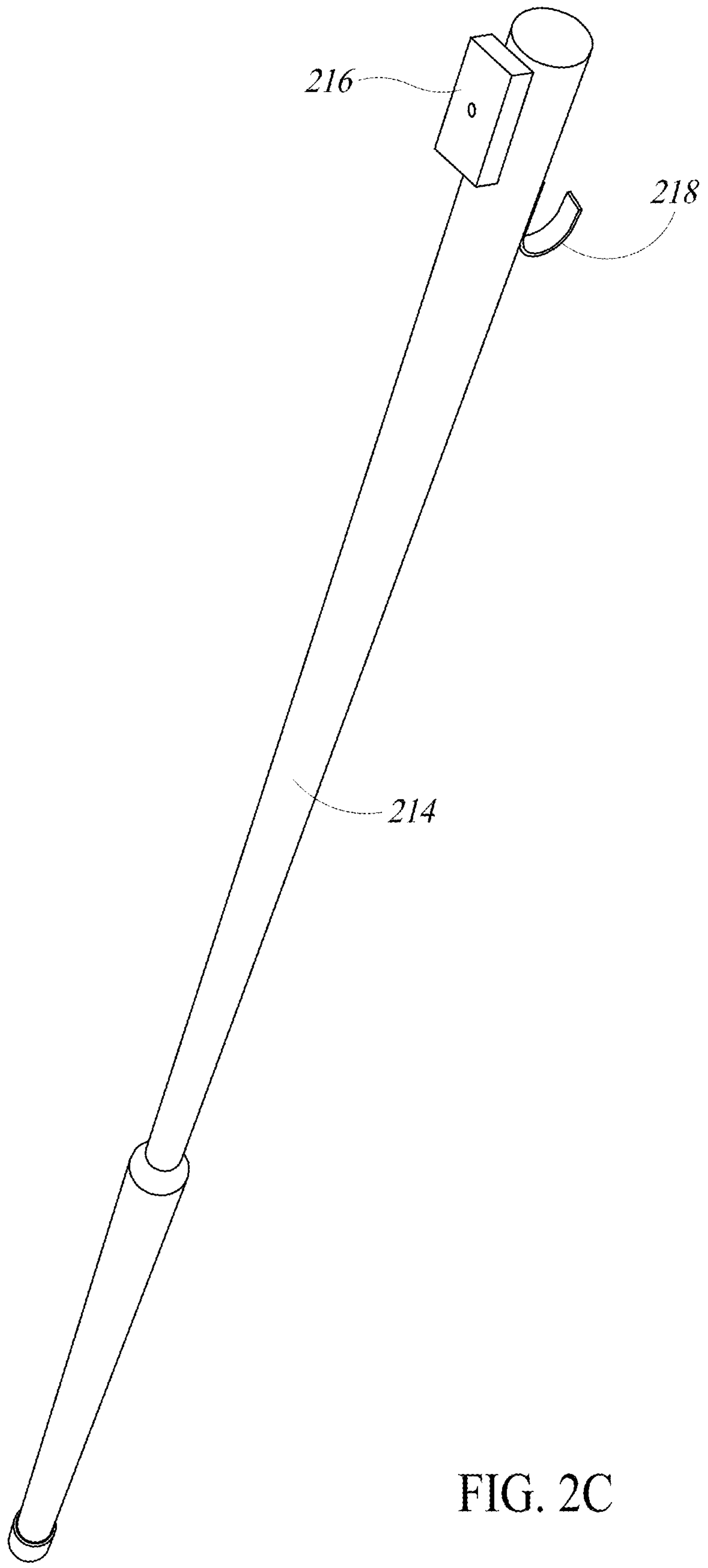
FIG. 2C is an illustration of a perspective top view of an installation pole, as described herein.

FIGS. 2A, 2B, and 2C are illustrations of example components of an example of a kit. FIGS. 2A, 2B, and 2C are meant to provide a general representation of components of the kit. However, the size, shape, and placement of the illustrated components is not meant to be limiting.

In examples, individual components of a kit may be either in disassembled or in pre-assembled condition when packaged.

As noted above, in examples, the kit may include a plurality of roofline magnets (such a roofline magnet 202 shown in FIG. 2A, which may correspond roofline magnet 108 of FIG. 1), a plurality of screws 206 (such as screw 206 as shown in FIG. 2A) to mount the plurality of roofline magnets to the roofline, a plurality of metal tabs (such as metal tab 208 as shown in FIG. 2B, which may correspond to metal tab 110 of FIG. 1), a plurality of rings (such as ring 212 as shown in FIG. 2B, which may correspond to ring 112 of FIG. 1), and installation pole (such as installation pole 214 as shown in FIG. 2C, which may correspond to installation pole 114 of FIG. 1).

FIG. 2A is an illustration of a perspective top view of a roofline magnet 202 and a screw 206, as described here. FIG. 2A illustrates a roofline magnet 202 (which may correspond to roofline magnet 108 of FIG. 1) of a plurality of roofline magnets included in the kit and a screw 206 of a plurality of screws included in the kit. The plurality of roofline magnets 202 may be mounted on the roofline (e.g., roofline 106 of FIG. 1). In embodiments (an example of which is illustrated in FIG. 2A), an individual roofline magnet 202 includes a hole 204 into which a screw 206 may be inserted to fasten the roofline magnet 202 to the roofline. A used herein, the term "hole" be used interchangeably with the terms void, aperture, etc.

In examples, the roofline magnet 202 may be a permanent magnet. In examples, the roofline magnet 202 may include neodymium. In examples, the roofline magnet 202 may be made from an alloy of neodymium, iron, and boron, as a $Nd_2Fe_{14}B$ tetragonal crystalline structure (also referred to herein as a "neodymium magnet"). In examples, the roofline magnet 202 may be comprised of a samarium-cobalt permanent magnet (SmCo). In examples, the roofline magnet 202 may comprise iron, nickel, samarium cobalt, steel, terbium, dysprosium, boron, or alloys thereof. As used herein, a "permanent magnet" is an object made from material that is magnetized and creates a persistent magnetic field. Though a permanent magnet may suffer from reduced attractive force if subjected to extreme temperatures or exposure to strong demagnetizing fields, permanent neodymium magnets maintain their strength at the range of surfaces temperatures of the earth. In examples, bonded neodymium magnets may be used.

In examples, one or more protective coatings (not shown) may be used on the roofline magnet(s) 202, to, for example, prevent exposure to the atmosphere and/or to enhance corrosion resistance. In examples, nickel, nickel-copper-nickel, and/or zinc plating may be used. In other examples, polymer, epoxy, and/or lacquer protective coatings may be used. Additionally or alternatively, the roofline magnet may be painted (for example, to match the roofline, house, trim, etc.). In examples, a primer may be used before any coat(s) of paint.

In examples, a roofline magnet 202 may be discal, e.g., a circular disc, etc. In examples, the roofline magnet 202 may be non-circular (e.g., rectangular, square, oval, etc.) The roofline magnet 202 may be of a uniform thickness or may vary in thickness. The roofline magnet 202 may be from about 0.5 inches to about 4.0 inches in width, or from about 0.7 inches to about 2.0 inches in width, or from about 1.0 inch to about 1.5 inches in width.

In examples, the roofline magnet 202 may include a hole 204 (in examples, a threaded hole, a bolt hole, a fixing hole, etc.), which may be located in the center of the roofline magnet 202 or set off from the center.

In examples, the kit may include a plurality of screws, such as screw 206. As noted above, in examples the screw 206 can be inserted to mount the roofline magnet 202 to a building structure, such as to roofline 106 of FIG. 1. The screw 206 may be threaded. The diameter of the hole 204 may correspond to the diameter of the screw 206 to be inserted, wherein the screw 206 may be tightened to secure the roofline magnet 202 in place. The hole 204 may be configured as countersunk, such that the top of the screw 206 may be fully recessed when screwed in.

An individual screw 206 may be configured to fasten a corresponding roofline magnet 202 to a respective point on the roofline (e.g., roofline 106 of FIG. 1) of a plurality of points on the roofline, wherein consecutive roofline magnets may be spaced at intervals discussed below.

Additionally or alternatively, other types of fasteners may be used to secure the roofline magnet(s) 202 to the roofline. In examples, a roofline magnet 202 may not have a prefabricated hole. In examples, a roofline magnet 202 may be secured without a screw, using adhesive on the roofline magnet 202 and/or the roofline. Further, a roofline magnet 202 may be attached to the roofline without a fastener and may itself magnetically connect to the roofline via magnetic attractive force that meets or exceeds a threshold magnetic attractive force which, with the other roofline magnets, withstands the weight of the string of lights with the metal tabs 208, and rings 212.

FIG. 2B is an illustration of a perspective top view of a metal tab 208 and ring 212, as described herein. FIG. 2B shows a metal tab 208 of a plurality of metal tabs included in examples of the kit and a ring 212 of a plurality of rings included in examples of the kit. A metal tab 208 may couple to a roofline magnet 202 via magnetic attraction. In examples described herein, a "metal tab" may be a material that will magnetically connect to a roofline magnet 202. The metal tab 208 may itself be magnetic, or the metal tab 208 may be composed of a material that may be attracted to the roofline magnet 202 and pole magnet (e.g., pole magnet 216 of FIG. 2C). In examples, the metal tab may comprise at least one of steel, stainless steel, iron, cobalt, or nickel. In examples, a magnetic field may be induced in the metal tab by the magnetic field emanating from a permanent roofline magnet.

The metal tab 208 may be any shape, and may include a slot 210 via which a ring 212 may be threaded. In examples, the metal tabs 208 may be cut with precision with a Computer Numerical Control (CNC) machine.

Consecutive metal tabs of the plurality of metal tabs (via rings 212) may be spaced along the string of lights 102 at regular intervals. The spacing between two consecutive metal tabs 208 (and/or rings 212) may, in examples, approximate the spacing of the roofline magnets 202, or, in examples, be longer than the spacing between roofline magnets by from about 0.1 to about 0.5 inches, or from about 0.33 to about 3.0 inches, or from about 2.0 to about 12 inches in diameter.

An individual ring 212 of the plurality of rings may be configured to secure a metal tab 208 of the plurality of metal tabs to the string of lights.

Metal tab 208 may have one or more notched and/or rounded corners. The metal tab 208 may be from about 0.5 to about 4.0 inches in width, or from about 0.75 to 2 inches in width, or from about 1 inch to about 1.5 inches in width.

A metal tab 208 connects to the string of lights. In examples, the metal tab 208 connects to the string of lights via a ring 212 that may be attached to both the metal tab 208 and a point on the string of lights. The metal tab 208 may have a slot 210 configured to thread through the ring 212 or other band, wherein the ring attaches the metal tab 208 to the string of lights in order to connect the metal tab 208 to the string of lights. The ring 212 loops around individual metal tabs 208 of the plurality of metal tabs and respective points of the string of lights, wherein the points may be a similar distance from each other as the roofline magnets 202 affixed to the roofline.

In examples, a ring 212 may be in the form of a keyring (that is, a single piece of material wrapped around itself). In that case, the metal tab 208 may be attached as a key would be, threading the metal tab 208 onto the ring 212 via the slot 210, and threading the ring 212 onto the string of lights. In examples, a cable tie, a string, a clip, latch, or tie may be used additionally or alternatively for linking a metal tab 208 to the string of lights. as used herein, a "band" may include any ring, cable tie, string, clip, latch, or tie that bands together the string of lights and the metal tab 208.

In examples, the width of the ring 212 may be from about 0.25 inches to about 1 inch, or from about 0.33 inches to about 1.33 inches, or from about 0.5 inches to about 2.5 inches. The diameter of the ring 212 may be longer than the height of the lightbulbs in order to keep the rings from slipping past the lightbulbs.

FIG. 2C is an illustration of a perspective top view of an installation pole 214, as described herein. Installation pole 214 (which may correspond to installation pole 114 of FIG. 1) may be used to hoist or lift the string of lights (e.g., string of lights 102 in FIG. 1) to the roofline (e.g., roofline 106 of FIG. 1) and to pull the string of lights from the roofline. The installation pole 214 may include, on a first side of a distal end, a hook 218 for pulling the string of lights away from the roofline, and, on the same or another side of the distal end, a pole magnet 216 to magnetically connect the metal tabs 208 to the installation pole 214 before lifting the installation pole 214 to the roofline, where the metal tabs transfer (with rings and string of lights in tow) to the roofline magnets due to stronger magnetic connection.

In an example shown in FIG. 2C, the installation pole 214 may be a telescoping pole of variable length, allowing a user to adjust the length of the installation pole 214 as desired. In this disclosure, a "telescoping pole" is used interchangeably with a "telescoping installation pole" and "installation pole." The lengths may be based on pre-set stopping points or may be of continuous range along the length of the telescoping pole. The example shown in FIG. 2C shows an installation pole 214 that is telescoping and in an extended or partially extended position. In examples, the installation pole 214 may be extendable to at least the height of the roofline's peak. In examples, the installation pole 214 may have a total extended length of 20 feet, using two 12-foot sections of polyvinyl chloride (PVC) pipe, with two feet of overlap per section. In examples, the installation pole 214 when extended may be from about 12 feet to about 36 feet in length, or from about 16 feet to about 30 feet in length, or from about 20 feet to about 24 feet in length. In examples, the installation pole 214 may be of fixed length.

The hook 218 may be at a location on a telescoping installation pole 214 such that when the installation pole 214 is in its shortest position, the hook 218 remains exposed. Similarly, the pole magnet 216 may be mounted at a location on the installation pole 214 such that when the telescoping installation pole 214 is in its shortest position, the pole magnet 216 remains exposed. The hook 218 may be a molded part of the installation pole 214 and made of the same material. Additionally or alternatively, the hook 218 and/or pole magnet 216 may be bound to the installation pole 214 via adhesive or mechanical means. The hook 218 may be u-shaped.

In examples, the installation pole 214 may be made of polyvinyl chloride (PVC). In examples, the installation pole 214 may be made of wood or other rigid material.

In examples, no installation pole is included in the kit. In examples, the kit may include the pole magnet 216 but not the installation pole 214, allowing a user to affix the pole magnet 216 on another elongate object. In examples, the kit may include the pole magnet 216 and hook 218, but no installation pole 214.

Pole magnet 216 may be made of ceramic ferrite. Pole magnet 216 may also be made of another magnetic material that has a weaker magnetic attraction to the metal tab 208 than the roofline magnet 202 has to the metal tab 208 so that when the metal tab 208 approaches the roofline magnet 202, the metal tab 208 may be pulled to the roofline magnet 202 from the pole magnet 216.

In examples, the pole magnet 216 may be affixed to the installation pole using a screw (e.g., screw 206 or a different screw), a washer and an adhesive (not shown).

The kit may include other components not illustrated in FIGS. 2A, 2B, and 2C, and/or not described herein. In examples, the kit may comprise fewer than all components or additional components.

Figure 3:
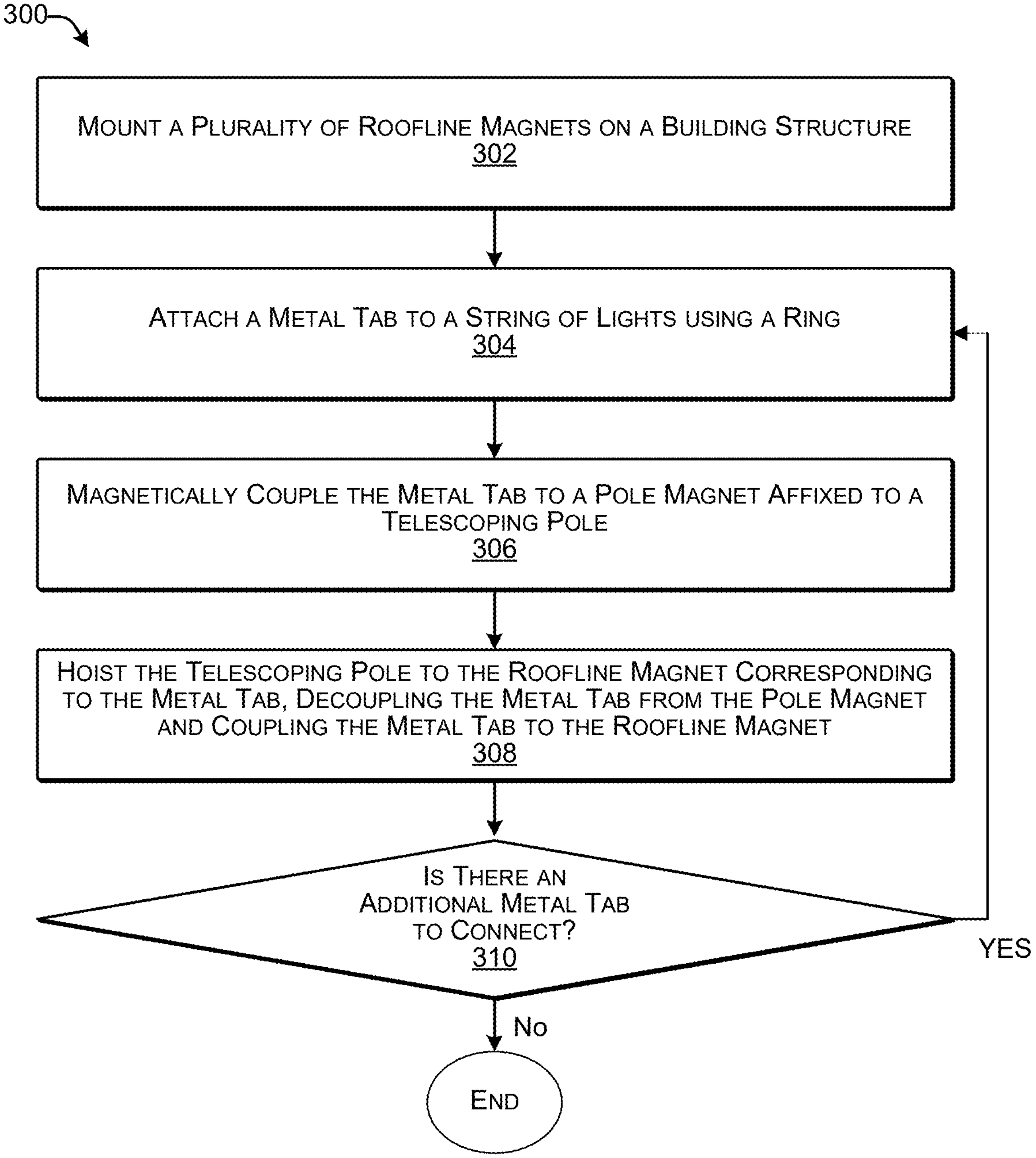
FIG. 3 is a flow diagram illustrating an example method for using the kit, as described herein.

FIG. 3 is a flow diagram illustrating an example method 300 for using the kit, as described herein.

At block 302, a plurality of roofline magnets are mounted on a building structure. In examples, the roofline magnets may be attached along a roofline of a house. In examples, the roofline magnets may be placed at other locations on a building structure, such as on or around windows, on a roof, on a gutter, on trim, etc. In other examples, the roofline magnets may be placed on other objects, for example, street light poles, trees, etc. In examples, the roofline magnets can be mounted to metal clips attached to gutters. In examples, the roofline magnets may be discal, with holes in the middle. Mounting the roofline magnets may comprise screwing threaded screws into the holes in the roofline magnets and into material of the roofline. In examples, the roofline magnets may be permanent neodymium magnets. In examples, the roofline magnets may have a protective plating or coating. In examples, the roofline magnets may be affixed to the building structure using different fasteners than screws (e.g., nails, adhesive, etc.) and/or the roofline magnets may be directly magnetically connected to a metallic portion of a roofline or building structure that is magnetic.

The roofline magnets may be spaced at intervals from about 15.75 to about 16.25 inches, from about 15 inches to about 17 inches, from about 14 inches to about 18 inches, or from about 12 to about 20 inches. In some examples, the roofline magnets may be regularly spaced; in some examples, there may be variation in the spacing between the roofline magnets. In examples, the distance may be at less than 25, 20, 19, 18, 17, 16, or 15 inches and in distances greater than 12, 15, 16, 17, 18, or 20 inches. Because strings of lights may vary in weight and have different types of bulbs, the particular spacing of roofline magnets may be at least partially dependent on the weight of the string of lights. A ladder may be used, long enough for an installer to reach the roofline (e.g., a 20-foot ladder, a 30-foot ladder, etc.).

At block 304, a metal tab is attached to the string of lights using a ring. In examples, the metal tabs may be attached to the string of lights at substantially similar intervals as the roofline magnets are mounted to the house. Alternatively, the metal tabs may be placed slightly further apart such that the string of lights droops between neodymium magnets, for aesthetic effect. In examples, the ring may be a keyring into which a slot in the metal tab can be inserted through the coils of the keyring. In examples, the string of lights can be inserted into the ring the same way.

In examples, the kit may include the rings and metal tabs already attached to each other. In examples, the rings may be attached to a string of lights, wherein the string of lights may be included in the kit. In examples, the string of lights, the metal tables, and the rings are connected as packaged.

At block 306, the metal tab is magnetically coupled to a pole magnet affixed to a telescoping pole.

At block 308, the telescoping pole is hoisted to the roofline magnet corresponding to the metal tab, decoupling the metal tab from the pole magnet and coupling the metal tab to the roofline magnet. The pole magnet may be a ceramic ferrite magnet. The metal tab is brought to a location at which the roofline magnet pulls it from the pole magnet; that location may vary depending on temperature, magnet size, magnet composition, etc., and is defined by the particular characteristics of magnetism and environment in each case (which will be apparent when the metal tab transfers to the roofline magnet).

At block 310, it is determined whether there is an additional metal tab to connect to a roofline magnet. If so, the process repeats from block 304. Alternatively, the string of lights may already be connected to a next ring and a next metal tab, in which case the process may repeat starting at block 306.

The string of lights may be pulled from the roofline by pulling the string of lights or the metal tab with the hook and detaching the metal tabs from the roofline magnets. The roofline magnets may be left in place year-round, or removed.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A kit for hanging a string of lights to a roofline of a building structure, the kit comprising:

a plurality of neodymium magnets including respective holes;

a plurality of screws, wherein an individual screw of the plurality of screws is configured to screw into a corresponding neodymium magnet of the plurality of neodymium magnets and is configured to fasten the corresponding neodymium magnet to a respective point on the roofline of a plurality of points on the roofline, wherein the plurality of neodymium magnets are discal;

a plurality of rings, wherein an individual ring of the plurality of rings is configured to secure a metal tab of a plurality of metal tabs to the string of lights, wherein consecutive rings of the plurality of rings are placed apart by a first distance that corresponds with a second distance between consecutive neodymium magnets of the plurality of neodymium magnets, and wherein the metal tab is configured to magnetically couple to a neodymium magnet of the plurality of neodymium magnets; and a telescoping pole configured to hoist the string of lights to the roofline via a ceramic ferrite magnet affixed to a first side of a distal end of the telescoping pole, wherein the ceramic ferrite magnet magnetically couples to the metal tab, wherein the metal tab magnetically couples to the neodymium magnet and decouples from the ceramic ferrite magnet, and wherein the telescoping pole includes a hook on a second side of the distal end of the telescoping pole.

2. The kit of claim 1, wherein the second distance is from about 15.75 to about 16.25 inches, from about 15 to about 17 inches, from about 14 inches to about 18 inches, or from about 12 to about 20 inches.

3. The kit of claim 1, wherein the first distance is greater than the second distance by from about 0.1 to about 0.5 inches, or from about 0.33 to about 3.0 inches, or from about 2.0 to about 12 inches in diameter.

4. The kit of claim 1, wherein the plurality of neodymium magnets are coated with at least one of nickel plating, nickel-copper-nickel plating, zinc plating, polymer protective coating, epoxy protective coating, or lacquer protective coating.

5. The kit of claim 1, further comprising the string of lights.

6. The kit of claim 1, wherein an individual neodymium magnet of the plurality of neodymium magnets is from about 0.5 to about 4.0 inches in width, or from about 0.75 to about 2.0 inches in width, or from about 1.0 inch to about 1.5 inches in width.

7. The kit of claim 1, wherein an individual metal tab of the plurality of metal tabs is from about 0.5 to about 4.0 inches in width, or from about 0.7 to about 2.0 inches in width, or from about 1.0 inch to about 1.5 inches in width.

8. The kit of claim 1, wherein a void in an individual neodymium magnet is at least one of threaded or countersunk.

9. The kit of claim 1, wherein the telescoping pole is adjustable to pre-set stopping points or is adjustable over a continuous range.

10. The kit of claim 1, wherein the hook is u-shaped.

11. The kit of claim 1, wherein an individual neodymium magnet of the plurality of neodymium magnets comprises $Nd_2Fe_{14}B$.

12. The kit of claim 1, wherein individual rings of the plurality of rings are from about 0.25 inches to about 1 inch in diameter, or from about 0.33 inches to about 1.33 inches in diameter, or from about 0.5 inches to about 2.5 inches in diameter.

13. A kit for a method of hanging of a string of lights on a roofline of a building structure, the kit comprising:

- a plurality of neodymium magnets;
- a plurality of screws, wherein an individual screw of the plurality of screws is configured to screw into an aperture of a corresponding neodymium magnet of the plurality of neodymium magnets and is configured to fasten the corresponding neodymium magnet to a respective point on the roofline of a plurality of points on the roofline;
- a plurality of rings, wherein an individual ring of the plurality of rings is configured to secure a metal tab of a plurality of metal tabs to the string of lights, wherein consecutive rings of the plurality of rings are placed apart by a first distance that corresponds with a second distance between consecutive neodymium magnets of the plurality of neodymium magnets, and wherein the metal tab is configured to magnetically couple to a neodymium magnet of the plurality of neodymium magnets; and
- a telescoping pole configured to hoist the string of lights to the roofline via a ceramic ferrite magnet affixed to a first side of a distal end of the telescoping pole, wherein the ceramic ferrite magnet magnetically couples to the metal tab, wherein the metal tab magnetically couples to the neodymium magnet and decouples from the ceramic ferrite magnet, and wherein the telescoping pole includes a hook on a second side of the distal end of the telescoping pole, wherein the method of hanging the string of lights using the kit comprises:

- mounting the plurality of neodymium magnets to respective points of the plurality of points on the roofline using respective screws of the plurality of screws, wherein the plurality of points are at one or more first distances apart;
- attaching the plurality of rings to the string of lights at one or more second distances apart;
- attaching the plurality of rings to respective metal tabs of the plurality of metal tabs, linking the string of lights to the plurality of metal tabs via the plurality of rings;
- magnetically coupling the metal tab on the string of lights to the ceramic ferrite magnet on the telescoping pole;
- holding a proximal end of the telescoping pole to lift the ceramic ferrite magnet at the distal end of the telescoping pole toward a corresponding neodymium magnet of the plurality of neodymium magnets on the roofline, wherein the ceramic ferrite magnet is magnetically coupled to the metal tab; and
- positioning the metal tab to a location at which the metal tab detaches from the ceramic ferrite magnet and transfers to the neodymium magnet based at least in part on relative magnetic forces of the neodymium magnet and the ceramic ferrite magnet.

14. The kit of claim 13, wherein the method of installation of the kit further comprises:

- detaching the string of lights from the roofline via pulling at least a portion of the string of lights using the hook, wherein the pulling breaks a magnetic bond between the plurality of metal tabs and the plurality of neodymium magnets and disengages the plurality of metal tabs or string of lights from the plurality of neodymium magnets.

15. The kit of claim 13, wherein the ceramic ferrite magnet is detached from the telescoping pole in the kit, wherein the kit further comprises a second screw, a washer, and an adhesive, and wherein the method of installation of the kit further comprises:

- affixing the ceramic ferrite magnet to the telescoping pole using the adhesive.

16. A kit for removably attaching a string of decorative objects to an exterior surface of a building structure, the kit comprising:

- a plurality of first magnets of a first magnetic force;
- a plurality of screws, wherein an individual screw of the plurality of screws is configured to pass through a respective aperture of a corresponding first magnet of the plurality of first magnets and is configured to fasten the corresponding first magnet to a respective point on the exterior surface of a plurality of points on the exterior surface;
- a plurality of metal tabs wherein an individual metal tab of the plurality of metal tabs is configured to magnetically couple to a first magnet of the plurality of first magnets;
- a plurality of bands, wherein an individual band of the plurality of bands is configured to secure a metal tab of the plurality of metal tabs to the string of lights; and
- a pole configured to hoist the string of lights to the exterior surface, wherein the pole includes a second magnet on a distal position on the pole, wherein the second magnet has a lower magnetic force than the first magnet.

17. The kit of claim 16, wherein the exterior surface comprises at least one of a roofline, an eave, a window frame, or a shingle.

18. The kit of claim 16, wherein a band of the plurality of bands comprises at least one of a keyring or a cable tie.

19. The kit of claim 16, wherein the plurality of first magnets comprise magnets comprising neodymium, iron, nickel, samarium cobalt, steel, terbium, dysprosium, boron, or alloys thereof.

20. The kit of claim 18, wherein the pole includes a u-shaped hook at a distal end.

* * * * *